(No Model.)
R. W. HENT.
ROLLER BEARING.
No. 408,237. Patented Aug. 6, 1889.
Fig. 1.
Fig. 5.
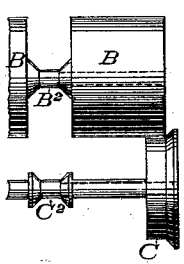
Fig. 6.
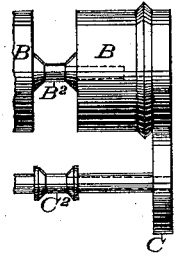
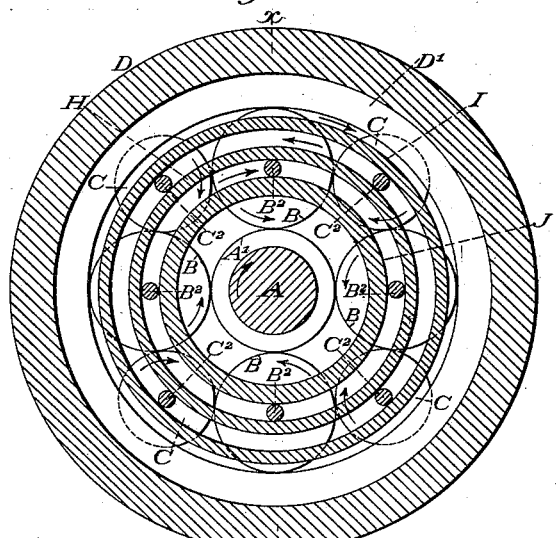
Fig. 3.
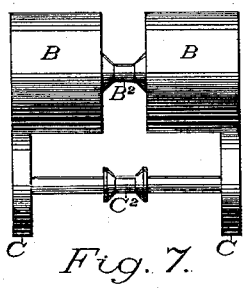
Fig. 4.
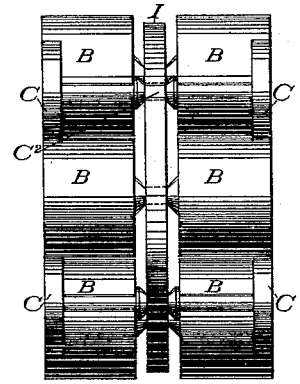
Fig. 7.
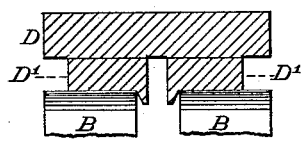
Fig. 2.
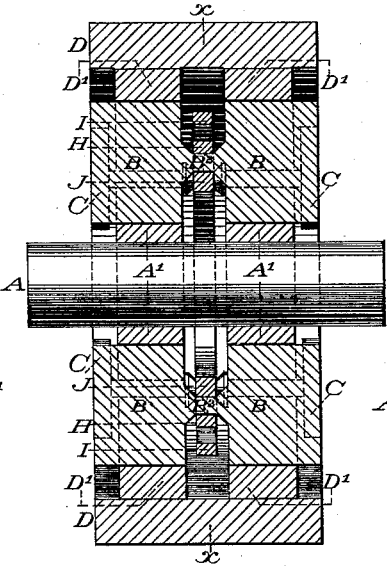
Fig. 8.
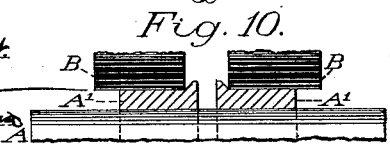
Fig. 9.
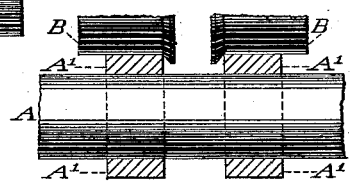
Witnesses:
Julius C. McEney
John D. Roberts
Inventor:
Renben W. Hent
Fig. 10.

UNITED STATES PATENT OFFICE.

REUBEN W. HENT, OF SAN FRANCISCO, CALIFORNIA.

ROLLER-BEARING.

SPECIFICATION forming part of Letters Patent No. 408,237, dated August 6, 1889.

Application filed December 19, 1888. Serial No. 294,044. (No model.)

*To all whom it may concern:*

Be it known that I, REUBEN W. HENT, a citizen of the United States, residing in the city and county of San Francisco, and State of California, have invented a certain new and useful Improvement in Roller-Bearings, of which the following is a specification.

My invention is an improvement on my roller-bearing shown and described in my application for patent filed August 3, 1888, Serial No. 281,880, in which a ring bears at its inner side on journals of a series of bearing-rollers bearing directly on the central journal and the bearing-casing and at its periphery on journals of a series of separating-rollers bearing only on the bearing-rollers, and a larger ring bears at its inner side on the latter journals. In said roller-bearing, if the axes of the bearing-rollers are without the figure (square) formed by the planes of the axes of the separating-rollers, and the central journal and bearing-rollers have become smaller from wear, the bearing-rollers, when free from the pressure of the load, will not bear on the central journal, but they will be kept from contact therewith and in their proper orbit only by their bearing on the separating-rollers, thus pressing the journals of the latter rollers against the inner side of the larger ring, possibly to the detriment of the latter journals and ring, unless prevented by the centrifugal force of the bearing-rollers, and if the axes of the bearing-rollers are in the sides of or within said figure these rollers if kept in their proper orbit will be kept therein only by their centrifugal force.

The object of my improvement is to keep the orbit of the bearing-rollers circular and its diameter constant whatever the position of their axes relatively to the axes of the separating-rollers and without detriment to the journals of the latter rollers or the larger ring, however little the centrifugal force of the bearing-rollers. This object is attained by the addition of a smaller ring bearing at its periphery on journals of the bearing-rollers. In such additional ring and the peculiar construction and combinations of the parts hereinafter set forth consists, essentially, my improvement. It is illustrated in the accompanying drawings, in which—

Figure 1 is a transverse section through the center or on the line *x x*, Fig. 2, of a roller-bearing embodying my improvement. Fig. 2 is a longitudinal section through the center or on the line *x x*, Fig. 1. Fig. 3 is a side view of a bearing-roller and a separating-roller, showing the relative positions of the rollers as seen along the plane tangent to both. Fig. 4 is a side view of my improved roller-bearing as it appears after the removal of the central journal and the casing. Figs. 5, 6, 7, 8, 9, and 10 are views showing means of retaining the several parts in their proper longitudinal positions.

A represents the shaft; A', sleeves upon the shaft; B, the bearing-rollers; $B^2$, the journals of the bearing-rollers; C, the separating-rollers; $C^2$, the journals of the separating-rollers; D, the casing; D', sleeves within the casing, and H, I, and J are the rings. The rings are coaxial and of different diameters, I representing the larger or outer, J the smaller or inner, and H the intermediate ring.

The sleeves A' and D' are of equal length, shorter than the rollers B, and located between the same planes. The sleeves A', with those portions of the shaft A upon which they are fitted, constitute the central journal, and the sleeves D', with those portions of the casing D within which they are fitted, constitute the bearing-casing. The rollers B bear on the central journal and bearing-casing, but, being longer than the sleeves, bear only portions of their lengths on said journal and casing, (bearing directly on and projecting beyond the sleeves,) and at their projections beyond the sleeves bear on the rollers C, each roller B on and between two rollers C. The rollers C bear only on the rollers B, and only on those portions of the rollers B not bearing on the central journal and the bearing-casing, bearing only on the rollers B at their said projections, each roller C on and between two rollers B. The journals $B^2$ are formed at the longitudinal centers of the rollers B and bear on the inner side of the ring H and on the periphery of the ring J. The journals $C^2$ are formed at the longitudinal centers of the rollers C and bear on the inner side of the ring I and on the periphery of the ring H.

on the inner side of the ring H and on the periphery of the ring J, and the series of rollers C, bearing only on the rollers B at their projections, and keeping the rollers B separate from each other, and having journals $C^2$, bearing on the periphery of the ring H and on the inner side of the ring I, all constructed and arranged substantially as shown and described, and for the purposes set forth.

9. In a roller-bearing, the combination, between the shaft and casing, of sleeves upon the shaft and sleeves within the casing, three coaxial rings of different diameters, a series of bearing-rollers bearing on and projecting beyond said sleeves and having journals bearing on the inner side of the intermediate ring and on the periphery of the inner ring, and a series of separating-rollers bearing only on the bearing-rollers at their projections, each separating-roller on and between two bearing-rollers to keep the latter rollers separate from each other, and having journals bearing on the periphery of the intermediate ring and on the inner side of the outer ring, keeping the separating-rollers from contact with the casing, all constructed, arranged, and operating substantially as and for the purposes set forth.

10. In a roller-bearing, the combination, between the shaft A and the casing D, of the sleeves A' and D', located between the same planes, the rings H, I, and J, the series of rollers B, bearing on and projecting beyond the sleeves and having journals $B^2$, bearing on the inner side of the ring H and on the periphery of the ring J, and the series of rollers C, bearing only on the rollers B at their projections, each roller C on and between two rollers B to keep the latter rollers separate from each other, and having journals $C^2$, bearing on the periphery of the ring H and on the inner side of the ring I, keeping the rollers C from contact with the casing, all constructed, arranged, and operating substantially as shown and described, and for the purposes set forth.

11. A roller-bearing comprising the central journal, the bearing-casing, three coaxial rings of different diameters, a series of bearing-rollers bearing only portions of their lengths on the central journal and the bearing-casing and having journals bearing on the inner side of the intermediate ring and on the periphery of the inner ring, a series of separating-rollers keeping the bearing-rollers separate from each other and bearing only on the portions of the bearing-rollers not bearing on the central journal and the bearing-casing, and having journals bearing on the periphery of the intermediate ring and on the inner side of the outer ring, keeping the separating-rollers from contact with the casing, all constructed, arranged, combined, and adapted to operate substantially as and for the purposes set forth.

12. A roller-bearing comprising the shaft A, the casing D, the sleeves A' and D', located between the same planes, the series of rollers B, bearing on and projecting beyond the sleeves and having journals $B^2$, bearing on the inner side of the ring H and on the periphery of the ring J, the rollers C, keeping the rollers B separate from each other and bearing only on the rollers B at their projections beyond the sleeves, each roller C on and between two rollers B and having journals $C^2$, bearing on the periphery of the ring H and on the inner side of the ring I, the said ring H interposed between and bearing on the journals $C^2$ at its periphery and on the journals $B^2$ at its inner side, the said ring I bearing at its inner side on the journals $C^2$ and keeping the rollers C from contact with the casing, and the said ring J bearing at its periphery on the journals $B^2$, all constructed, arranged, combined, and adapted to operate substantially as shown and described, and for the purposes set forth.

REUBEN W. HENT.

Witnesses:
JULIUS C. McCENEY,
JOHN D. ROBERTSON.